United States Patent [19]

Sato et al.

[11] Patent Number: 5,423,012
[45] Date of Patent: Jun. 6, 1995

[54] APPARATUS AND METHOD IN A COMPUTER FOR EXECUTING CALCULATION INSTRUCTIONS AND DATA INSTRUCTIONS HAVING UNIFORM WORD LENGTHS

[75] Inventors: Fumiki Sato; Kouichi Fujita, both of Hyogo, Japan

[73] Assignee: Mitsubishi Denki Kabushiki Kaisha, Tokyo, Japan

[21] Appl. No.: 977,947

[22] Filed: Nov. 18, 1992

[30] Foreign Application Priority Data

Dec. 10, 1991 [JP] Japan .................................. 3-349944

[51] Int. Cl.$^6$ .......................... G06F 9/00; G06F 13/00
[52] U.S. Cl. ................................ 395/375; 364/239; 364/259.5; 364/263; 364/DIG. 1
[58] Field of Search ................................ 395/375, 250

[56] References Cited

U.S. PATENT DOCUMENTS 4,370,709  1/1983  Fosdick ........................ 395/375
5,057,837  10/1991  Colwell et al. .................. 341/55

Primary Examiner—Parshotam S. Lall
Assistant Examiner—Ayni Mohamed
Attorney, Agent, or Firm—Townsend and Townsend Khourie and Crew

[57] ABSTRACT

In a microcomputer, for using all the instruction words having uniform word length, a first or second instruction word stored in a memory area of a memory indicated by an address of an address register is read in a predetermined word position of an instruction first-reading buffer indicated by a first pointer and the first or second instruction word read from a word position of the instruction first-reading buffer indicated by a second pointer is read in an instruction interpreting section through a second shifter. This instruction interpreting section interprets an instruction word from a bus interface section. In the case of the second instruction word (data instruction), data necessary for a calculation are produced on the basis of data of the second instruction word such as immediate data and offset data. In the case of the first instruction word, a calculation is effected on the basis of data produced by a data expansion section.

3 Claims, 10 Drawing Sheets

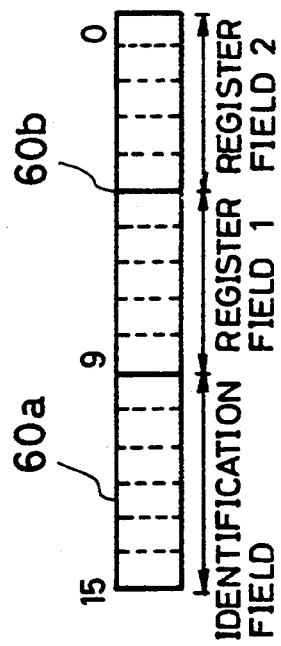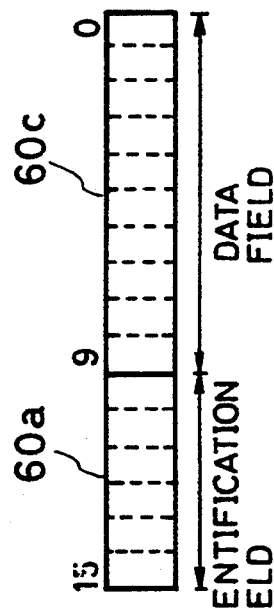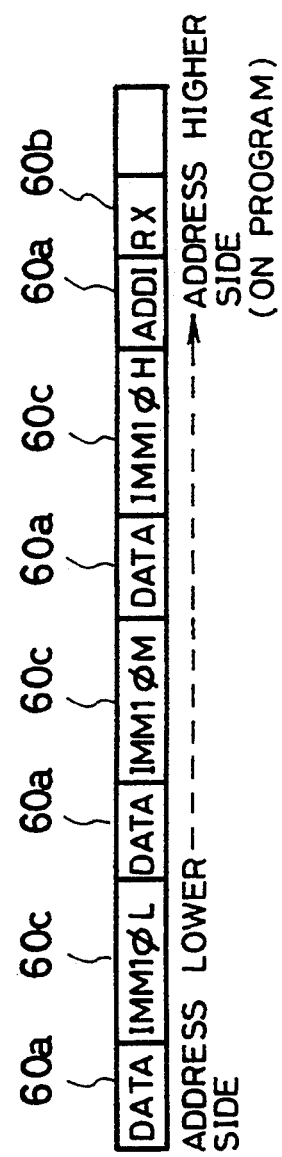

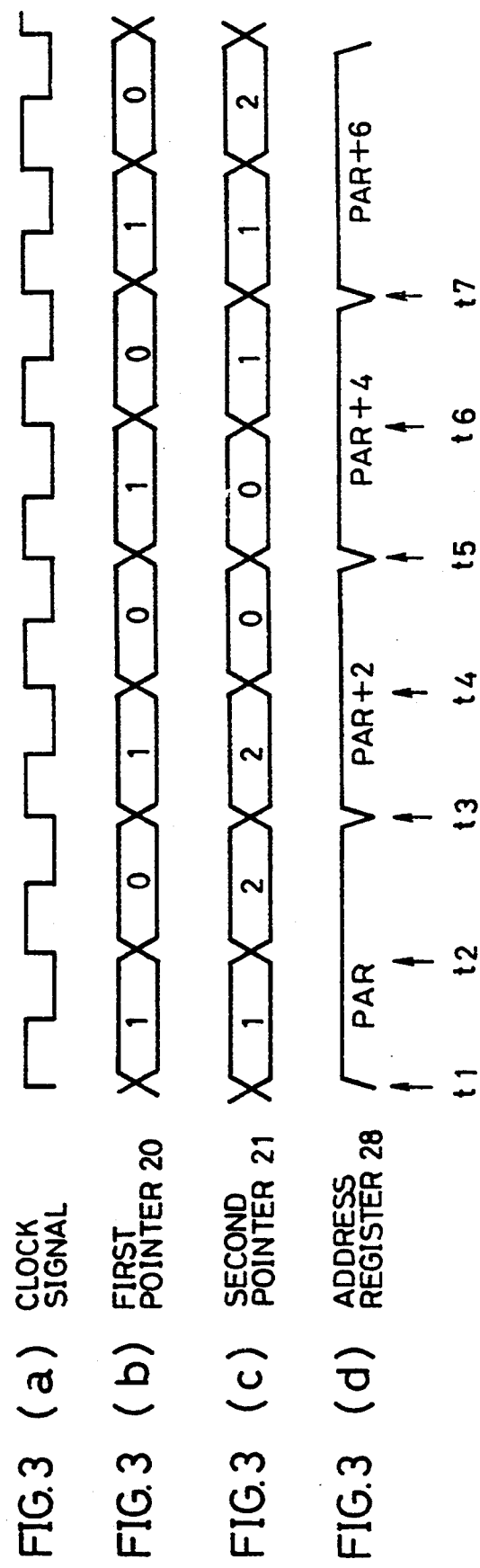

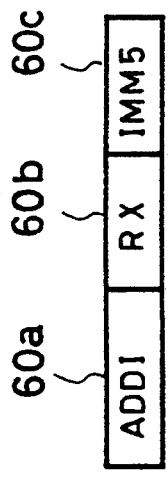
FIG. 4 (a) FORMAT OF CALCULATION INSTRUCTION
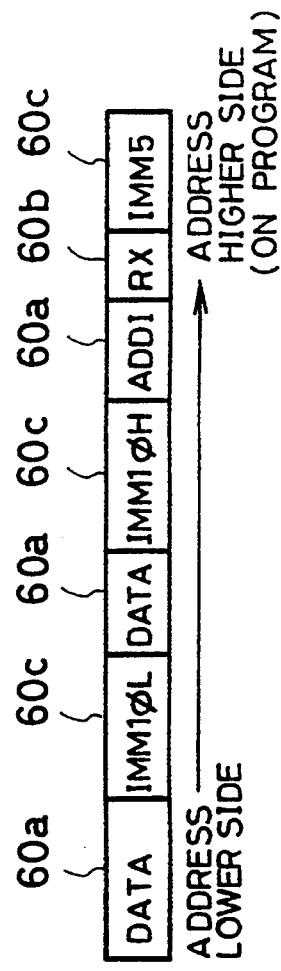
FIG. 4 (b) FORMAT OF INSTRUCTION WORD (3 INSTRUCTIONS)

FIG.5 (1) 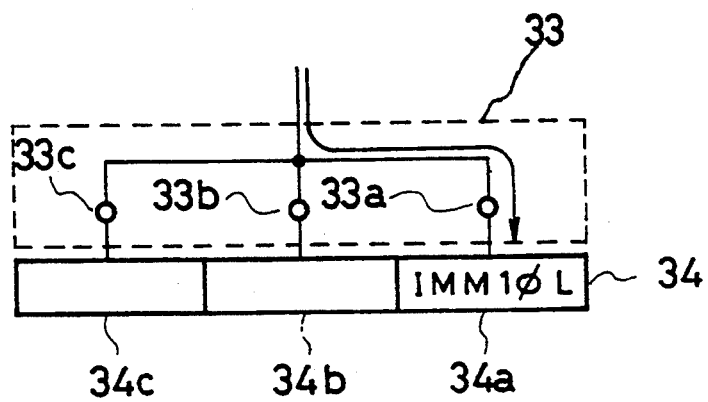
FIG.5 (2) 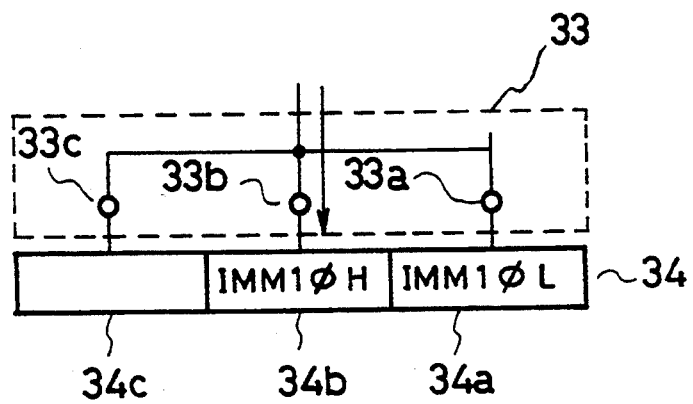
FIG.5 (3) 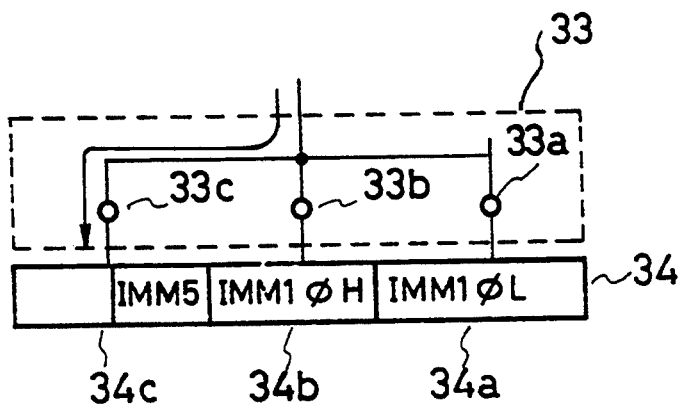

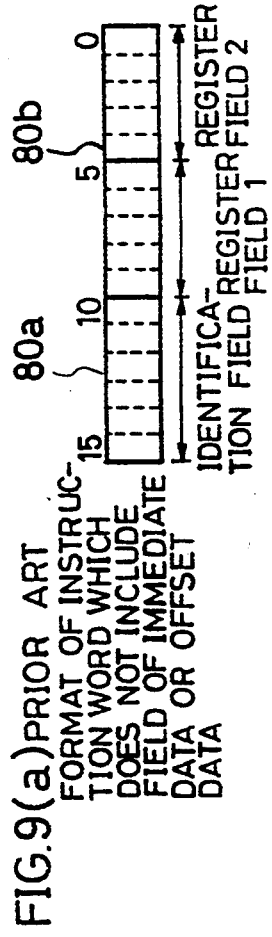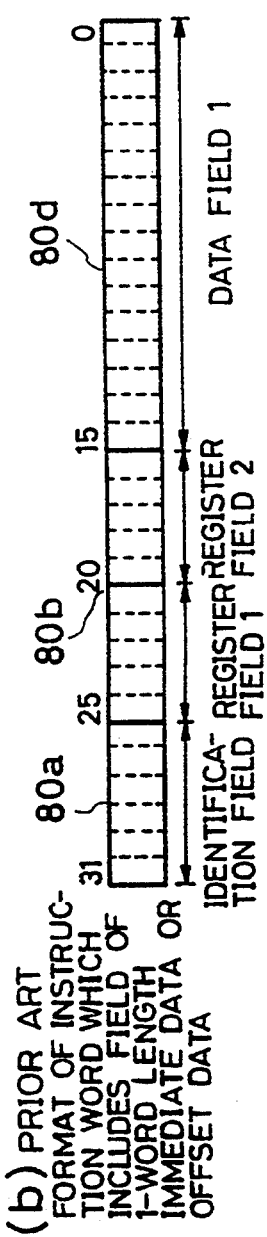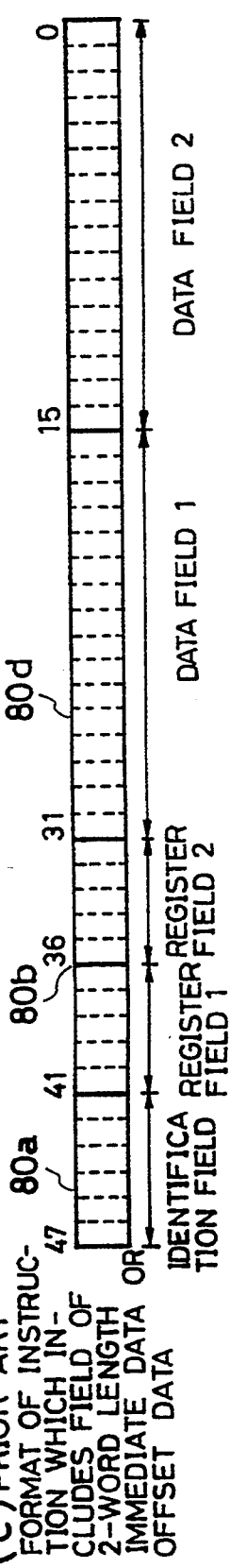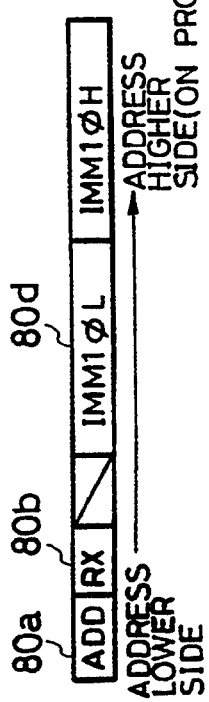

FIG.9(a) PRIOR ART FORMAT OF INSTRUCTION WORD WHICH DOES NOT INCLUDE FIELD OF IMMEDIATE DATA OR OFFSET DATA

FIG.9(b) PRIOR ART FORMAT OF INSTRUCTION WORD WHICH INCLUDES FIELD OF 1-WORD LENGTH IMMEDIATE DATA OR OFFSET DATA

FIG.9(c) PRIOR ART FORMAT OF INSTRUCTION WORD WHICH INCLUDES FIELD OF 2-WORD LENGTH IMMEDIATE DATA OR OFFSET DATA

FIG.9(d) PRIOR ART FORMAT OF INSTRUCTION (3 INSTRUCTIONS)

FIG.10(a) CLOCK SIGNAL
PRIOR ART
FIG.10(b) FIRST POINTER 20
PRIOR ART
FIG.10(c) SECOND POINTER 21
PRIOR ART
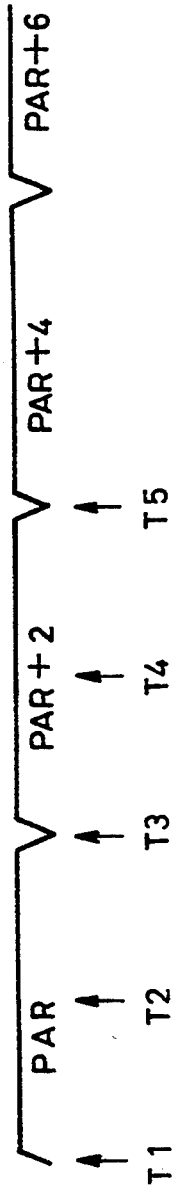
FIG.10(d) ADDRESS REGISTER 28
PRIOR ART

APPARATUS AND METHOD IN A COMPUTER FOR EXECUTING CALCULATION INSTRUCTIONS AND DATA INSTRUCTIONS HAVING UNIFORM WORD LENGTHS

BACKGROUND OF THE INVENTION

1. Field of the Invention

The present invention relates to a microcomputer, and more particularly to a microcomputer whose instruction word length is uniform.

2. Description of the Prior Art

FIG. 8 is a block diagram showing an arrangement of a conventional microcomputer. In FIG. 8, numeral 14 represents a data bus, 15 designates an address bus, 16 depicts a control signal bus, 17 denotes a first shifter, and 18 indicates an instruction first-reading buffer. Further, numeral 20 is a first pointer, 21 represents a second pointer, 22 denotes a first adder, 23 designates a second adder, 24 depicts a third adder, 25 indicates a first decoder, 26 is a second decoder, and 27 denotes a bus timing generating means. Moreover, numeral 28 is an address register, 29 represents a fourth adder, 36 designates an ALU (arithmetic and logic unit), 37 denotes a register file, 70 depicts a second shifter, 71 is a bus interface means, 72 is an instruction interpreting means, 73 is a data expansion means and 74 designates an executing means.

The data bus 14 is a bus for reading an instruction word from a memory or the like, not shown, into the bus interface means 71, the address bus 15 is a bus for supplying the address data of the address register 28 to a memory or the like, and the control signal bus 16 is a bus for supplying a writing/reading signal (R/W) to a memory or the like. The first shifter 17 of the bus interface means 71 comprises gates 17a to 17c whereby an instruction word with 1-word length on the data bus 14 is stored in predetermined word positions 18a to 18c of the instruction first-reading buffer 18 under the gate control. The instruction first-reading buffer 18 is a data buffer which can temporarily store an instruction word with 3-word length, whereby a 1-word length instruction word is stored in the word position 18a to 18c selected by the gates 17a to 17c of the first shifter. The first pointer 20 indicates the number of the 1-word length instruction words stored in the instruction first-reading buffer 18. For example, the number is 0 to 3. The second pointer 21 indicates the word position of the instruction word to be read out at the next time. The first adder 22 is, for example, a 2-bit adder for calculating the sum (addition) of the contents of the first and second pointers 20 and 21 and has a carrier output. The second adder 23 adds +1 to the first pointer (content) 20 when a 1-word length instruction word is read in the instruction first-reading buffer 18 through the data bus 14, adds −1 thereto when an instruction word is read out from the instruction first-reading buffer 18 or the read-in and read-out of a 1-word length instruction word and a 2-word length instruction word are simultaneously performed, adds −2 thereto when a 2-word length instruction is read from the instruction first-reading buffer 18, and adds +0 thereto when the read-in and read-out of a 1-word length instruction word is simultaneously effected. The third adder 24 adds +1 to the second pointer 21 when a 1-word length instruction word is read out from the instruction first-reading buffer 18 and adds +2 thereto when a 2-word length instruction word is read out from the instruction first-reading buffer 18.

The first decoder 25 decodes the output of the first adder 22 and controls the gates 17a to 17c of the first shifter 17 to ON. For example, when the output of the first adder 22 is "0" or "3", the gate 17a of the first shifter 17 is turned ON, and when the output thereof is "1" or "4", the gate 17b is turned ON, and when the output thereof is "2", the gate 17c is turned ON. The second shifter 70 comprises gates 70a to 70c the control of which allows a 2-word length instruction word to be read out from the word positions 18a to 18c of the instruction first-reading buffer 18 in the instruction interpreting means 72 or the data expansion means 73. The second decoder 26 decodes the output of the second pointer 21 to control the second shifter 70. For example, when the output of the second pointer 21 is "0", the gates 70a and 70b are simultaneously turned ON, and when the output thereof is "1", the gates 70b and 70c are turned ON, and when the output thereof is "2", the gates 70a and 70c are turned ON. The bus timing generating circuit 27 puts data such as an address and R/W on the address bus 15 and the control signal bus 16 at adequate timings. The address register 28 keeps addresses and indicates the address of an instruction word stored in a memory area of a memory, not shown. The fourth adder 29 adds +2 whenever the instruction word of the contents of the address register 28 is read in the bus interface means 71. The instruction interpreting means 72 interprets the instruction word from the bust interface means 71 to control the executing means 74. The data expansion means 73 sign-expands 2-word length data from the instruction first-reading buffer 18 of the bus interface means 71 and the executing means 74 executes the calculation indicated by the instruction interpreting means 72. The ALU 36 performs the arithmetic calculation, and the register file 37 is constructed with a program counter, general-use register and others and stores data for the calculation.

FIG. 9 shows a detailed example of the instruction word used in a conventional microcomputer. In FIG. 9, (a) indicates a format of an instruction word which does not include a field of offset data or immediate data and which comprises an identification field 80a (10 to 15 in bit number) and a register field 80b (0 to 9 in bit number). The register field 80b is further divided into a register field 1 (5 to 9 in bit number) and a register field 2 (0 to 4 in bit number). In FIG. 9, (b) shows a format which includes a field of a 1-word length immediate data or offset data and which has a 1-word length data field 80d (0 to 15 in bit number) and has the information that a 1-word length data is included in an identification field 80a (26 to 31 in bit number). In FIG. 9, (c) shows a format of an instruction word which has a 2-word length data field 80d (0 to 31 in bit number), wherein a data field 80d is further divided into a data field 1 (16 to 30 in bit number) and a data field 2 (0 to 15 in bit number) and an identification field 80a (42 to 47 in bit number) has the information that a 2-word length data is included. Further, in FIG. 9, (d) shows a format of an instruction word on a program which has 2-word length immediate data "IMM1φL, IMM1φH". To an identification field 80a there is inputted an "ADD" data, and to a register field 1 of a register field 80b there is inputted a register number RX.

FIG. 10 is a time chart showing an operation of a conventional microcomputer. In FIG. 10, (a) shows a clock signal which acts as a reference, (b) shows an operating state of the first pointer 20, (c) shows an operating state of the second pointer, and (d) shows an operating state of the address register 28.

Secondly, a description will be made hereinbelow in terms of the conventional microcomputer. First, the summary of the operation will first be described and the detailed operation will then be described. In the case of performing ADD RX, IMM1φ, that is, in the case of executing an instruction that the sum of the data of the register number RX and the immediate data of IMM1φ is calculated and stored in the register number RX, this instruction word takes the instruction word format on the program as illustrated in FIG. 9. To the lower-address identification field 80a there is inputted the information having "ADD" and the immediate data corresponding to a 2-word length, to the register field 1 of the register field 80b there is inputted the register number RX, to the register field 1 of the register field 80b there is inputted the low-order data "IMM1φL" of "IMM1φ", and to the data field 2 of the data field 80d there is inputted the high-order data "IMM1φH" of "IMM1φ". This instruction word of ADD RX, IMM1φ is read from the memory area of a memory indicated by the address of the memory address register 28 of the bus interface means 71 into the word positions 18a to 18c of the instruction first-reading buffer 18 indicated by the first pointer 20, each of which has one word length, and read out from the word positions 18a to 18c of the instruction first-reading buffer 18, indicated by the second pointer 21, at every 2 words. The instruction interpreting means 72 reads and decodes the instruction data by one word in order from the low address in FIG. 9(d), for example. Since the identification field 80a is "ADD", the first instruction word is determined as an addition instruction, and since it has 2-word immediate data "IMM1φL, IMM1φH", the request of these immediate data is made with respect to the bus interface means 71 through the executing means 74. When the intermediate data is read out from the instruction first-reading buffer 18 of the interface means 71, the instruction interpreting means 72 causes the 2-word length immediate data to pass through the data expansion means 73 so as to be added to the data of the register number RX in the register file 37 in the ALU 36 under the control of the executing means 74, the addition result being stored in the register number RX.

Further, the detailed operation of the conventional microcomputer will be described with reference to FIG. 10. First, let it be assumed that the content of the first pointer 20 is "1", the content of the second pointer 21 is "1", and the above-mentioned instruction word ADD RX, IMM1φ is executed. At the time T1, the executing means 74 requests a 1-word length instruction word with respect to the bus interface means 71. Since at this time the content of the first point 20 is "1", the bus interface means 71 decides that the instructed word requested by the executing means 74 has already been read in the word position 18b of the instruction first-reading buffer 18 and hence decodes the content "1" of the second pointer 21 through the second decoder 26 and turns on the gate 70b of the second shifter 70 whereby the 1-word length instruction "ADD RX" is read out from the word position 18b of the instruction first-reading buffer 18 to the instruction interpreting means 72. At the same time, in the bus interface means 71, since the word positions 18a, 18c (2 words) of the instruction first-reading buffer 18 become vacant, the preparation for reading the next instruction word is made. The instruction interpreting means 72 decodes the 2-word immediate data information and and "ADD" of the identification field 80a after the instruction read from the word position 18b of the instruction first-reading buffer 18 of the bus interface means 71 and further decodes the register number RX of the register field 1 of the register field 80b, thereby controlling the executing means 74 and the data expansion means 73. Thereafter, since the 1-word length instruction word is read from the instruction first-reading buffer 18, the content of the first pointer 20 of the bus interface means 71 is added (subtracted) by −1 so as to become "0", and the content of the second pointer 21 is added in the third adder 24 to become "2".

At the time T2, the executing means 74 requests "IMM1φL (low-order data), IMM1φH (high-order data)" of the 2-word length immediate data "IMM1φ", which belong to the above-mentioned instruction word, with respect to the bus interface means 71. In response to the request, the bus interface means 71 decides that the immediate data is not read in the instruction first-reading buffer 18 because the content of the first pointer 20 is "0" and hence, causes the executing means 74 to assume a waiting state. Thereafter, the 1-word immediate data "IMM1φL" of the address PAR indicated by the address register 27 is read from a memory (not shown) through the data buss 14 and the gate 17c of the first shifter 17 in the word position 18c of the instruction first-reading buffer 18. Then, +1 is added to the content of the first pointer 20 in the second adder 23 so as to become "1". The word position 18c of the instruction first-reading buffer 18 in which the immediate data of the instruction word is read is determined in accordance with the output of the first adder 22. That is, the content "0" of the first pointer 20 is added to the content "2" of the second pointer 21 so that 0+2=2 is decoded in the first decoder 25 so as to select the gate 17c of the first shifter 17.

At the time T3, the bus interface means 71 decides that the instruction first-reading buffer 18 is vacant (because the content of the first pointer 20 is "1") and starts the read-in of the immediate data "IMM1φH" of the next instruction word from a memory, not shown. At the time T4, the immediate data of the next instruction word is read from the memory and then +1 is added to the content of the first pointer 20 in the second adder 23 so as to become "2". At the time T5, since the content of the first pointer 20 is "2", the bus interface means 71 decides that the immediate data of the 2-word instruction word requested by the executing means 74 is read in the instruction first-reading buffer 18 and decodes the content "2" of the second pointer 21 by the second decoder and turns on the gate 70a of the second shifter 70 so as to read out the 2-word length immediate data from the word positions 18a and 18c of the instruction first-reading buffer 18. In response to the reception of the 2-word length immediate data, the executing means 74 performs, under the control of the instruction interpreting means 72, the addition of the immediate data and the data of the register number RX of the register file 37 [RX+IMM1φ (2-word length immediate data IMM1φL, IMM1φH)]. A this time, the instruction interpreting means 72 controls the data expansion means 73 so that the 2-word length immediate data passes as it is. On the other hand, bus interface means 71 successively reads the instruction words from the memory if the instruction first-reading buffer 18 makes a vacancy by at least one word. After the time T5, the content "2" of the first pointer 20 and the content "2" of the second pointer 21 are added to each other in the first adder 22 so that the output of the first adder becomes "4". This "4" is decoded in the first decoder 25 and the gate 17b of the first shifter 17 is ON-controlled. As a result, the next instruction word is read in the word portion 17b of the instruction first-reading buffer 17.

Since in the conventional microcomputer the word lengths of the instruction word to be used as described above are not uniform, it is required that the identification field of the instruction word having the immediate data, offset data and others is equipped with the information indicative of the word number of the word lengths such as the immediate data and offset data, whereby the first-reading control of the microcomputer becomes complicated and the circuit arrangement also becomes complicated so as to provide a problem that the calculation processing speed becomes low.

SUMMARY OF THE INVENTION

This invention has been developed in order to resolve the above-described problem, and it is therefore an object to provide to a microcomputer in which the word lengths of all the instruction words to be used are arranged to be uniform whereby it is possible to easily perform the first-reading control, simplify the circuit structure and perform the calculation at a high speed.

In a microcomputer according to a first embodiment of this invention, all the instruction words to be used in this microcomputer are uniform and comprises a first instruction word including an instruction for performing the calculation and the like and a second instruction word constructed with data such as offset data. Further, as illustrated in FIG. 1, this microcomputer comprises a bus interface means 10, a first shift means (shift means 33) for performing a shifting operation by a predetermined number of bits so that the data of a second instruction read from the bus interface means is not overlapped, a data coupling means (data buffer 34) for coupling data with the data of the second instruction being shifted by a predetermined bits in the first shift means, a data expansion means 35 for adding a sign to a predetermined bit position of the data coupled by the data coupling means so as to perform a sign expansion to a predetermined word length, an executing means 12 for executing a predetermined calculation in accordance with the interpretation of the instruction word, and an instruction interpreting means for controlling the above-mentioned first shift means, the data coupling means, data expansion means and executing means in accordance with the first or second instruction word. In addition, the above-mentioned bus interface means comprises a first buffer (instruction first-reading buffer 18) constructed with a plurality of words, a first shifter 17 for reading the first or second instruction word, stored in a memory area of a memory indicated by an address of an address register, from the memory through the address into a predetermined word position of the first buffer, a second shifter 31 for reading out the first and second instruction word from the aforementioned word position, and a first buffer indicating means 32 for indicating the aforementioned word position with respect to the first and second shifters.

In a microcomputer according to a second embodiment of this invention, as shown in FIG. 6, the bus interface means comprises a second shift means (shift means 45) having second buffers (instruction first-reading buffers 46a to 46c) different from the first buffers and coupled in series to the first buffer with the same number of words and arranged such that the first or second instruction word stored in the memory area of the memory indicated by the address of the address register is successively read from the memory through the address bus in the second buffers and read out from the second buffers in order of the reading-in to the second buffers, and further comprises a second buffer indicating means (buffer indicating means 50) for, when an instruction word is read in the second buffers, increasing a numeric value by the number of the instruction words read and, when the first or second instruction word is read out from the second buffers, decreasing the numeric value by the number of the instruction words read out so as to control the second shift means in accordance with the numeric value.

In a microcomputer according to a third embodiment of this invention, the bus interface means is not provided unlike the microcomputers according to the first and second embodiments.

The operation of the microcomputer according to the first embodiment is as follows. That is, in the bus interface means, the first shifter reads, through the address bus, the first or second instruction word stored in the memory area of the memory indicated by the address of the address register so as to keep it in the word position of the first buffer. Further, the second shifter reads out the first or second instruction word from the word position of the first buffer. Secondly, the instruction interpreting means interprets the instruction word from the bus interface means and, in the case that the interpreted instruction is the second instruction word, controls the first shift means, data coupling means and data expansion means to produce calculation data on the basis of the data such as the immediate data and offset data to be used for the operation and others. Moreover, in the case that the interpreted instruction word is the first instruction word, the instruction interpreting means control the executing means to perform the calculation on the basis of the data produced by the data expansion means and others.

In the microcomputer according to the second embodiment, the interface means operates as follows. That is, when the first or second instruction word is read in the second buffers of the second shift means, the second buffer indicating means increases a numeric value by the number of the read instruction words, and when the first or second instruction word is read out from the second buffers, the second buffer indicating means decreases the numeric value by the number of the read-out instruction words. Further, the second buffer indicating means indicates the number of the instruction words currently read in the second buffer and controls the second shift means on the basis of the numeric value. If the second buffer is vacant, the second shift means successively reads the first or second instruction word, stored in the memory area of the memory indicated by the address of the address register, in the second buffers by the vacancy number, and further reads out the read first or second instruction word from the second buffers into the first shift means or the instruction interpreting means in order of the reading into the second buffer.

In the microcomputer according to the third embodiment, the instruction interpreting means interprets the instruction word and, in the case that the interpreted instruction word is the second instruction word, controls the first shift means, data coupling means and data expansion means to produce calculation data on the basis of the data such as the immediate data and the offset data to be used for the calculations. Further, when the interpreted instruction word is the first instruction word, the instruction interpreting means controls the executing means on the basis of the data produced by the data expansion means so as to execute the calculations.

The above and other objects, features, and advantages of the Invention will become more apparent from the following description when taken in conjunction with the accompanying drawings.

BRIEF DESCRIPTION OF THE DRAWINGS

FIGS. 2(a)–2(e) are a detailed example of an instruction word to be used in the FIG. 1 microcomputer;

FIGS. 3(a)–3(d) are a time chart showing an operation of the FIG. 1 microcomputer;

FIGS. 4(a) and 4(b) are an applied example of the FIG. 2 instruction word;

FIGS. 5(1)–5(3) are an illustration of processes of a shift means and a data buffer in FIG. 4;

FIGS. 9(a)–9(d) are a detailed example of an instruction word to be used in the FIG. 8 microcomputer; and FIGS. 10(a)–10(d) are a time chart showing an operation of the FIG. 8 microcomputer.

DESCRIPTION OF THE PREFERRED EMBODIMENT

Figure 1:
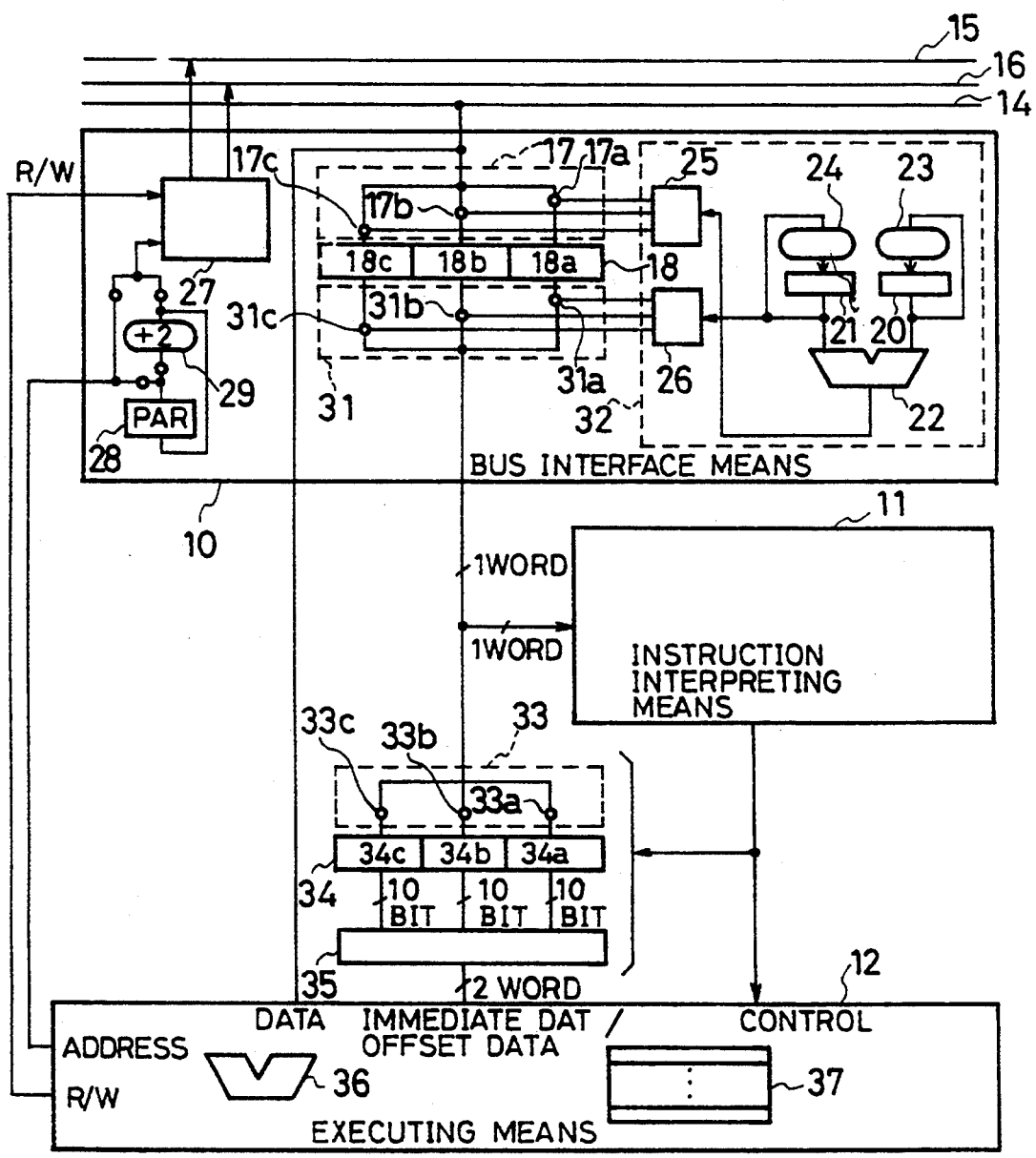
FIG. 1 is a block diagram showing a microcomputer according to a first embodiment of the present invention.
Figure 8:
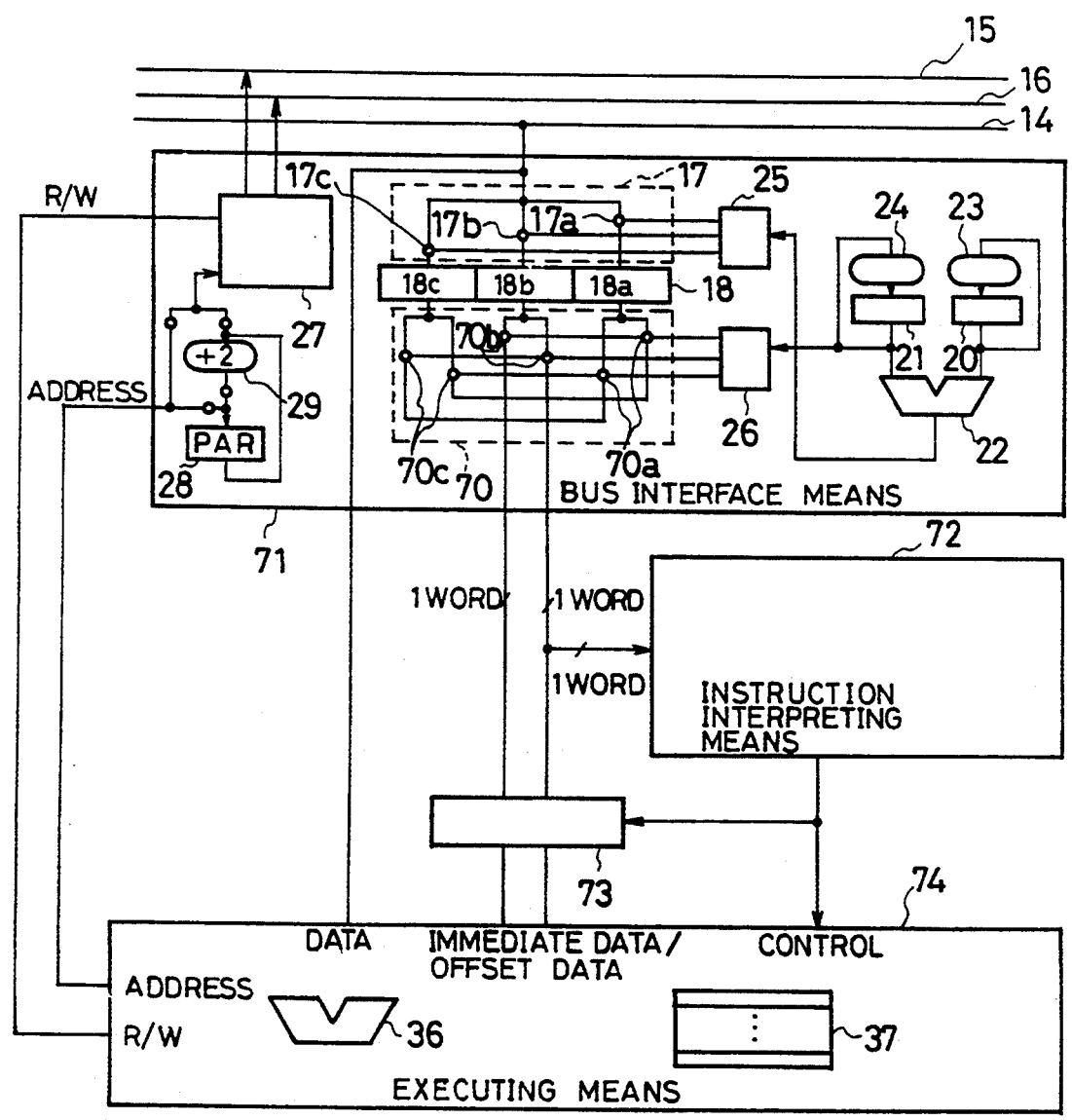
FIG. 8 is a block diagram showing a conventional microcomputer.

An embodiment of this invention will be described hereinbelow with reference to the drawings. FIG. 1 is a block diagram showing an arrangement of a microcomputer according to a first embodiment of this invention. In FIG. 1, numeral 10 represents a bus interface means, 11 designates an instruction interpreting means, 12 depicts an executing means, 14 denotes a data bus, 15 is an address bus, and 16 indicates a control signal bus. Further, numeral 17 is a first shifter, 18 represents an instruction first-reading buffer which acts as a first buffer, 20 depicts a first pointer, 21 represents a second pointer, 22 represents a first adder, 23 is a second adder, 24 designates a third adder, 25 represents a first decoder, and 26 is a second decoder. Moreover, numeral 27 is a bus timing generating means, 28 represents an address register, 29 is a fourth adder, 31 depicts a second shifter, 32 denotes a buffer indicating means which acts as a first buffer indicating means, 33 is a shift means which acts as a first shift means, 34 represents a data buffer which acts as a data coupling means, 35 indicates a data expansion means, 36 represents an ALU (arithmetic and logic unit), and 37 is a register file. Here, in FIG. 1, parts corresponding in function to the portions of the conventional microcomputer (FIG. 8) are marked with the same numerals and characters and the detailed description thereof will be omitted.

In the bus interface means 10, the first pointer 20 of the buffer indicating means 32 indicates the number of the instruction words stored in the instruction first-reading buffer 18, for example, takes a value of 0 to 3.

The second pointer 21 indicates the position of the instruction word to be subsequently read out from the instruction first-reading buffer 18. The instruction first-reading buffer 18 is a data buffer which is capable of temporarily storing the instruction word having 3-word length (18a to 18b). The first shifter 17 is composed of gates 17a to 17b and is a shifter for shifting the instruction word on the data bus to a predetermined position of the instruction first-reading buffer 18 in accordance with the instruction of the first decoder 25 and storing it. The second shifter 31 comprises gates (31a to 31c) and is a shifter for reading out the instruction word from the predetermined word position of the instruction first-reading buffer 18 into the instruction interpreting means 11 in accordance with the instruction of the first decoder 26.

The instruction interpreting means 11 receives and interprets instruction words having a uniform word length from the bus interface means 10 and controls the executing means 12, data buffer 34, shift means 33 and data expansion means 35 in accordance with the instruction word. Although the instruction to be used herein will hereinafter be described in detail, all the instruction words to be used in this microcomputer have a uniform length and are divided into a first instruction word for performing the process such as a calculation and a second instruction word having data such as immediate data and offset data for calculations and others.

The data buffer 34 comprises 10-bit length buffers 34a to 34c which perform a combination of the immediate data and the offset data given by a plurality of second instruction words from the bus interface means 10. The shift means 33 comprises gates 33a to 33c whereby the immediate data and the offset data of the plurality of second instruction words are stored in the data buffer 34 by means of the instruction interpreting means 11 so that the immediate data and the offset data are not overlapped with each other. The data expansion means 35 gives zero-sign to 3 10-bit length data combined in the data buffer 34 so as to sign-expand them to obtain a data format which is usable in the executing means 12. The executing means 12 has a function similar to that of the conventional example, while being capable of processing the 2-word length data combined and sign-expanded.

FIG. 2 shows a concrete example of the instruction word to be used in the microcomputer according to this embodiment. All the instruction word to be used in the microcomputer have a length of 1-word (16 bits) and divided into a calculation instruction which is the first instruction word and a data instruction which is the second instruction word. As shown in FIG. 2(a), the format of the calculation instruction is divided into an identification field 60a (10 to 15 in bit number) and a register field 60b (0 to 9 in bit number). The register field 60b is further divided into a register field 1 (5 to 9 in bit number) and a register field 2 (0 to 4 in bit number). Further, as illustrated in FIG. 2(b), the data instruction format is divided into an identification field 60a (10 to 15 in bit number) and a data field 60c (0 to 9 in bit number). Here, the identification field 60a is a field for differentiating between the calculation instruction and the data instruction, the register field 60b is a field for data indicative of the file number of the register file 37 in the executing means 12, and the data field 60c is a field in which the immediate data and the offset data are inputted. FIG. 2(c) shows a detailed format of an instruction word on the program which includes 4 instructions. In the identification field 60a there is inputted "DATA". The instruction word corresponding to 3 instructions from the address lower side indicates the data instruction and the data of "IMM1φL, IMM1φM, IMM1φH" are respectively inputted in the data field 60c. Further, in the identification field 60a of the instruction word corresponding to 1 instruction at the address higher side there is inputted "ADDI" which is an calculation instruction for addition. Moreover, in the register field 1 of the register field 60b there is inputted data of the register number RX of the register file 37.

FIG. 3 is a time chart showing the operation of the microcomputer according to this embodiment. In FIG. 3, (a) illustrates a clock signal to be used in this microcomputer, (b) shows an operating state of the first pointer 20 within the bus interface means 10 in FIG. 1, (c) indicates an operating state of the second pointer 21, and (d) illustrates an operating state of the address register 28. Secondly, a description will be made with reference to FIGS. 1 to 3 in terms of the operation of the microcomputer. The summary of the operation will first be described with reference to FIGS. 1 and 2 and the detailed operation will then described with reference to FIG. 3.

In the bus interface means 10, the instruction words at the addresses indicated by the address register 28 are successively inputted from a memory, not shown, through the data bus 14 to the word positions 18a to 18c of the instruction first-reading buffer 18 indicated by the first pointer 20. For example, the instruction word is as illustrated by (c) in FIG. 2 and adds the register number in the register file 37 of the executing means 12 to the immediate data "IMM1φL, IMM1φM, IMM1φH" given by the above-mentioned 3 instructions of the data instruction so as to store the addition result in that register number RX. Then, the gates 31a to 31b of the second shifter 31 indicated by the second pointer 21 of the instruction first-reading buffer 18 are controlled to ON so that the instruction word stored in the instruction first-reading buffer 18 is read by one word in the instruction interpreting means 11. The instruction interpreting means 11 interprets the instruction word, as illustrated by (c) in FIG. 2, from the address lower side. Further, if the identification field 60a of the instruction word is "DATA", a decision is made as the data instruction, and hence the data in the data field 60c is shifted and successively stored in the 10-bit buffers 34a to 34c of the data buffer 34. Thus, the instruction interpreting means 11 combines the data of "IMM1φL, IMM1φM, IMM1φH" in the data buffer 34. Secondly, the instruction interpreting means 11 reads the calculation instruction (one instruction at the address higher side) of the FIG. 2(c) instruction word from the bus interface means 10 and decides the addition instruction on the basis of the "ADDI" of the identification field 60a after the instruction. In addition, the instruction interpreting means 11 sign-expands the data of "IMM1φL, IMM1φM, IMM1φH", combined and produced in the data buffer 34, to the 2-word length in the data expansion means 35, and then controls the executing means 12 so that this sign-expanded data is added to the data of the register number RX of the register file 37 within the executing means 12, thereafter terminating the calculation.

A detailed description will be made with reference to FIG. 3. The description is made in terms of the case of executing the instruction word as shown in (c) of FIG. 2. Here, let it be assumed that the content of the first pointer 20 is "1", the content of the second pointer 21 is "1", and one instruction at the low address is read in the word position 18b of the instruction first-reading buffer 18. First, at the time t1 in FIG. 3, the executing means 12 requests the bus interface means 10 to supply the 1-word length instruction word (the instruction word "DATA IMM1φL" at the lower address side in FIG. 2(c)). At this time, since the content of the first pointer 20 is "1", the bus interface means 10 decides that the instruction word requested has already been read in the word position 18b of the instruction first-reading buffer 18 and reads out the instruction word from the word position 18b into the instruction interpreting means 11. Further, since the content of the second pointer 21 is "1", the gate 31b of the second shifter 31 is controlled to ON. Here, since the instruction first-reading buffer 18 has a vacancy corresponding to 2 words, the bus interface means 10 starts the first-reading operation of the next instruction word through the data bus 14 from the memory area of the memory (not shown) indicated by the address PAR of the address register 28. The instruction interpreting means 11 interprets, on the basis of the data "DATA" of the identification field (60a in FIG. 2(c)) of the instruction word supplied from the bus interface means 10, that this instruction word is a data instruction, thereby controlling the executing means 12, data buffer 34 and shift means 33. At this time, the executing means 12 does not perform the data processing such as calculations because the instruction word is the data instruction. Further, the 10-bit immediate data of the data instruction is shifted by the shift means 33 (the gate 33a is turned ON) and stored in the bit position of the buffer 34a of the data buffer 34. In addition, the 10-bit immediate data of the next data instruction is stored in the bit position of the buffer 34b of the data buffer 34. Thereafter, since the 1-word instruction word is read out from the instruction first-reading buffer 18, in the bus interface means 10, −1 is added to the content of the first pointer 20 by means of the second adder 23 and +1 is added to the content of the second pointer 21 by means of the third adder 24. As a result, the content of the first pointer 20 becomes "0" and the content of the second pointer 21 becomes "2" (see the first pointer 20 in FIG. 3(b) and the second pointer 21 in FIG. 3(c)).

At the time t2, the executing means 12 requests the bus interface means 10 to supply the next 1-word instruction word (DATA IMM1φM). Since the content of the first pointer 20 is "0", the bus interface means 10 decides that the next instruction word is not read in the instruction first-reading buffer 18 so as to cause the executing means 12 to take a waiting state. Thereafter, the next 1-word instruction word is read from the memory, not shown, in the instruction first-reading buffer 18 of the bus interface means 10. That is, +1 is added to the content of the first pointer 20 by means of the second adder 23 so that the content of the first pointer 20 is changed from "0" to "1", and since the content of the first pointer 20 is "0" and the content of the second pointer 21 is "2", the first adder 22 provides 0+2=2. This addition result "2" is decoded by the first decoder 25 and the gate 17c of the first shifter 17 is controlled to ON and further the next 1-word instruction word (the data instruction "DATA IMM1φM") is stored in the word position 18c of the instruction first-reading buffer 18.

At the time t3, since the content of the first pointer 20 is "1", the bus interface means 12 supplies the 1-word instruction word from the buffer 18c of the instruction first-reading buffer 18 to the executing means 12 and further starts the reading of the next instruction word from the memory, nor shown, into the instruction first-reading buffer 18. When the 1-word length instruction word is read out from the instruction first-reading buffer 18 to the instruction interpreting means 9, in the bus interface means 10, −1 is added to the content of the first pointer 20 by the second adder 23 and +1 is added to the content of the second pointer 21 by the third adder 24. The instruction interpreting means 11 decides, on the basis of the data "DATA" in the identification field 60a of the supplied instruction word, that this instruction word is a data instruction, thereby controlling the executing means 12, data buffer 34 and shift means 33. At this time, the executing means 12 does not perform the data processing such as calculations because the instruction word is the data instruction. The 10-bit immediate data "IMMϕ1M" of this data instruction is shifted by the shift means 33 and stored in the bit position of the buffer 34b of the data buffer 34. The 10-bit immediate data of the next data instruction is shifted and stored to and in the bit position of the buffer 34c of the data buffer 34.

At the time t4, the executing means requests the next 1-word instruction word with respect to the bus interface means 10. Since the content of the first pointer 20 is "0", the bus interface means 10 decides that the next 1-word instruction word is read in the instruction first-reading buffer 18 and hence causes the executing means 12 to take the waiting state. Thereafter, in the bus interface means 10, since the next 1-word instruction word is read from the memory through the data bus 14 into the instruction first-reading buffer 18, +1 is added to the content of the first pointer 20 by the second adder 23 so that the content of the first pointer 20 becomes "0" and the content of the second pointer 21 become "0". As a result, the first adder 22 causes 0+0=0, and this addition result 0 is decoded by the first decoder 25, and the position in which the next instruction word is read is the word position 18a of the instruction first-reading buffer 18. The next instruction word (data instruction "DATA IMMϕH") is read in the word position 18a.

As well as the time t4, at the time t5, the 1-word instruction word is read out from the word position 18a of the instruction first-reading buffer 18 and the 10-bit immediate data of the read instruction word is shifted and stored to and in the bit position of the buffer 34c of the data buffer 34. At the time t6, as well as the time t4, the next 1-word length instruction word (the calculation instruction "ADDI RX") is read from the memory into the bit position of the buffer 34b of the data buffer 34. Further, in the data buffer 34, the data of "IMMϕ1H, IMMϕ1M, IMMϕ1L" are stored in the bit positions of the buffers 34c to 34a and combined. At the time t7, since the content of the first pointer 20 of the bus interface means 10 is "1", the 1-word instruction word is read from the word position 18b of the instruction first-reading buffer 18 into the instruction interpreting means 11. The instruction interpreting means 11 interprets the identification field 60a of the supplied instruction word and decides that this instruction word is the calculation instruction of "ADDI RX", thereby controlling the executing means 12 and data expansion means 35. The data expansion means 35 adds a zero sign (corresponding to 2 bits) to a predetermined bit position of the 30-bit data (buffers 34a to 34c) stored in the data buffer 34, thereby performing the sign-expansion.

Under the control of the instruction interpreting means 11, in response to reception of the sign-expanded 2-word immediate data, the executing means 12 performs the addition of the sign-expanded 2-word immediate data and the register number of the register file 37 in the ALU 36 and stores the addition result in the register number RX of the register file 37, thereby terminating the execution of the instruction word.

As described above, according to the microcomputer of the first embodiment, since the word length of the instruction word used is uniform, the bus interface means can simply be constructed. That is, since the data width of the output of the second shifter for reading out the instruction word from the instruction first-reading buffer is decreased from 2 words to 1 word as compared with the conventional one, the second shifter and the circuits relating to this second shifter can simply arranged as compared with the conventional one.

FIG. 4 shows an application example of the instruction word to be used for the microcomputer according to the first embodiment. In FIG. 4, (a) indicates the format of a calculation instruction. Although the word length is similar to the word length in FIG. 2, the identification field 60a "ADDI", register field 60b "RX" and data field 60c "IMM5" are combined. As compared with the calculation instruction described with reference to FIG. 2(a), although the register field 1 of the register field 60b is not changed, the register field 2 is arranged to be the data field 60c. Further, in FIG. 4, (b) indicates an instruction word on the program. The identification field 60a is combined with the 2 instructions "DATA, IMM1ϕL, DATA IMM1ϕH" of the "DATA" data instructions and a calculation instruction having a format similar to that of the calculation instruction indicated by (a).

FIG. 5 shows a process in time series in the data buffer in the case of processing the instruction word indicated in FIG. 4. In the case of processing the instruction word illustrated in (b) of FIG. 4, in (1) the gate 33a of the shift means 33 is turned On by the instruction interpreting means 11 and the data "IMM1ϕL" of the data instruction is stored in the bit position of the buffer 34a of the data buffer 34. In (2) the gate 33b of the shift means 33 is similarly turned ON by the instruction interpreting means 11 and the data "IMM1ϕH" of the next data instruction is stored in the bit position of the buffer 34b of the data buffer 34. Further, in (3) the gate 33c of the shift means 33 is turned ON and the data "IMM5" of the data field 60c of the calculation instruction is stored in the bit position of the buffer 34c of the data buffer 34. Moreover, the data combined in the data buffer 34 is expanded up to the 2-word length in the data expansion means 35 so as to be used by the executing means 12 for the calculation. With the calculation instruction as described above, as compared with the FIG. 2 instruction word, a longer immediate data can be used with the same instruction word number.

Figure 6:
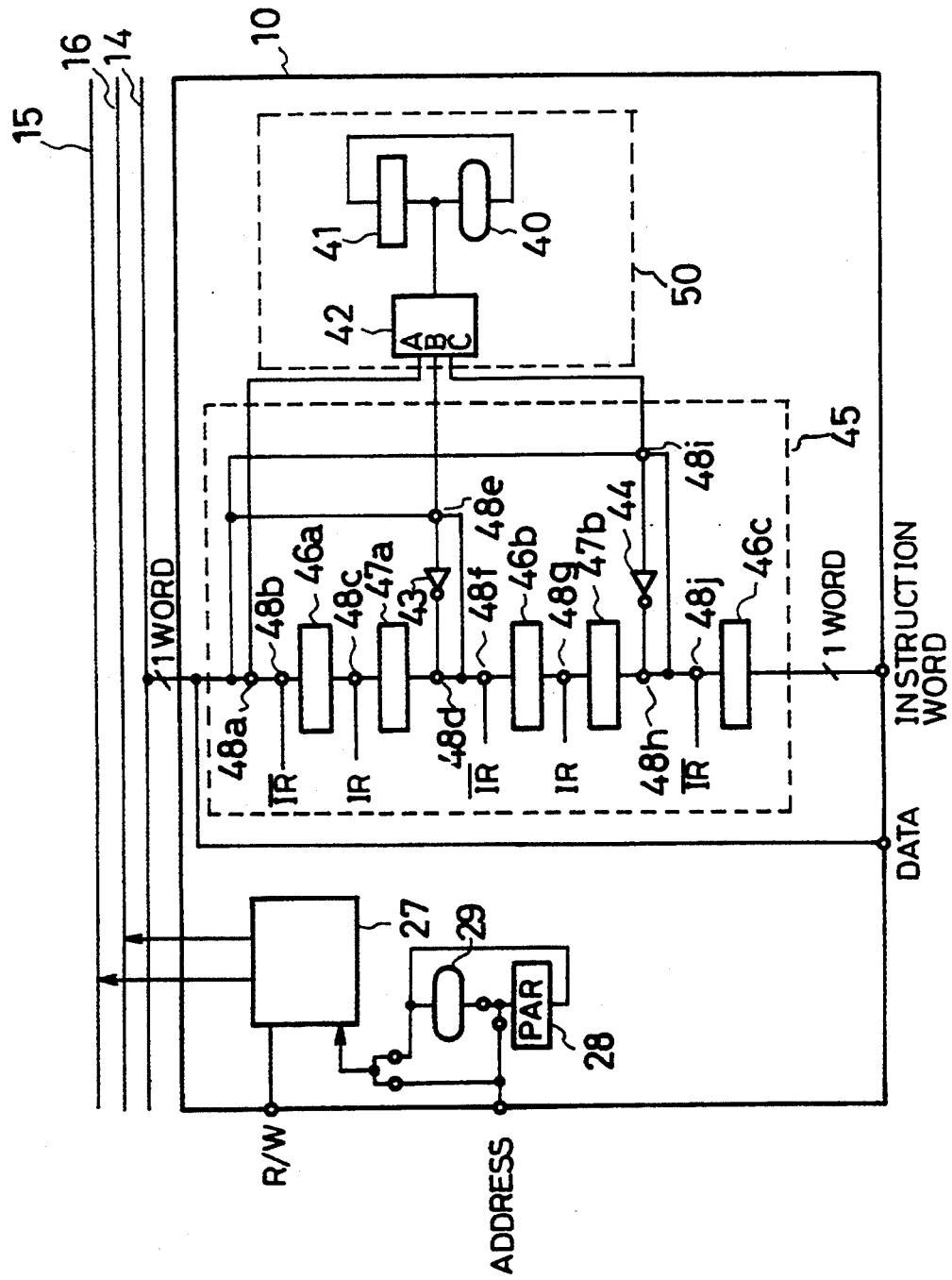
FIG. 6 is a circuit diagram showing in detail a bus interface means of a microcomputer according to a second embodiment of this invention.

FIG. 6 is a block diagram showing an interface means in a microcomputer according to a second embodiment of this invention. As compared with the microcomputer according to the first embodiment, the microcomputer according to the second embodiment includes the interface means having a simpler arrangement. Here, the instruction word to be used is similar to the instruction word in the microcomputer according to the first embodiment. In FIG. 6, numeral 40 represents an adder, 41 designates a pointer, 42 depicts a decoder, 43 and 44 are inverters, 45 is a shift means which acts as a second shift means, 46a to 46c are instruction first-reading buffers which act as a second buffer, 47a and 47b represent latch circuits, 48a to 48j denote gates, 50 represents a buffer indicating means which acts as a second buffer indicating means, and IR and IR (inversion) are signals. The other portions have the same functions as those in the microcomputer according to the first embodiment.

The pointer 41 indicates the number of the instruction words stored in the instruction first-reading buffers 46a to 46c, for example, indicates a value of 0 to 3. The adder 40 of the buffer indicating means 50 adds +1 to the content of the pointer 41 when newly reading in the instruction word, adds −1 to it when reading out the instruction word, and adds +0 to it when simultaneously the reading-in and reading-out of the instruction word or when both the reading-out and reading-in of the instruction word are not effected. The decoder 42 decodes the content of the pointer 41 and, for example, outputs a "1" signal to the gates 48a to 48j so as to control these gates to ON. The C of the decoder 42 becomes ON when the content of the pointer 41 is "0", the B of the decoder 42 becomes ON when the content thereof is "1", the A of the decoder 42 becomes ON when the content thereof is "2", and all the A, B and C of the decoder 42 becomes OFF when the content thereof is "3". The IR is a signal which becomes ON when successively reading out the instruction words, and the IR (inversion) is a signal which becomes OFF when the IR is ON and which becomes ON when the IR is OFF.

Figure 7:
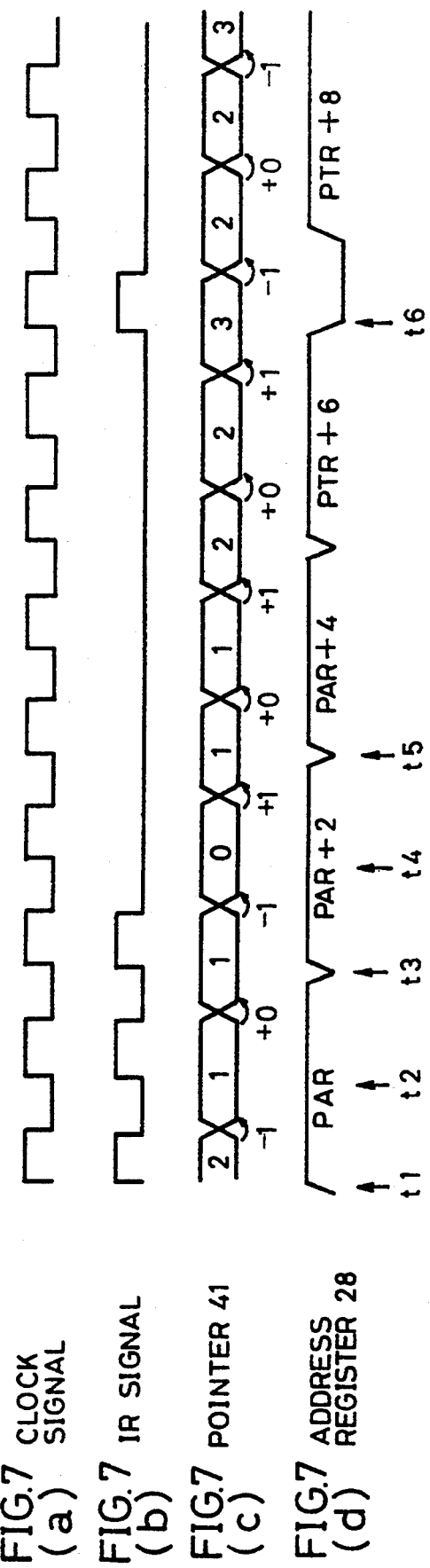
FIGS. 7(a)–7(d) are a time chart showing an operation of the FIG. 6 bus interface means.

FIG. 7 is a time chart showing the operation of the bus interface means of the microcomputer according to the second embodiment. In FIG. 7, (a) represents a clock signal which is a reference, (b) indicates the IR signal, (c) depicts an operating state of the pointer 41, and (d) denotes an operating state of the address register 28.

Secondly, a description will be made with reference to FIGS. 6 and 7 in terms of the operation of the microcomputer according to the second embodiment. Assuming that 2 instruction words are stored in the instruction first-reading buffers 46b and 46c, at this time the content of the pointer 41 is "2". The, at the time t1, the 1-word length instruction word is read out from the instruction first-reading buffer 46c, and due to the IR and IR (inversion) signals, the instruction word of the instruction first-reading buffer 46b is shifted through data latch 47b to the instruction first-reading buffer 46c. At this time, −1 is added to the content of the pointer 41 in the adder 41 so that the content of the pointer 41 becomes "1", thereby performing the reading-in of a new instruction word. At the time t2, the content "1" of the pointer 41 is decoded by the decoder 42 and the B of the decoder 42 is controlled to ON, and the gate 48e becomes ON and the gate 48d becomes OFF due to the inverter 43. The instruction word from the data bus 14 is stored in the instruction first-reading buffer 46b, and the data is read out from the instruction first-reading buffer 46c, and due to the IR and IR (inversion) signals, the instruction word stored in the instruction first-reading buffer 46b is shifted to the instruction first-reading buffer 46c. Since the instruction word is read in by one and read out by one, +0 is added to the content of the pointer 41 in the adder 40 whereby the content of the pointer 41 is not changed as it is. At the time t3, the instruction word of the instruction first-reading buffer 46c is read out. As a result, −1 is added to the content of the pointer 41 in the adder 40 so that the content thereof becomes "0". At the time t4, the content "0" of the pointer 41 is decoded by the decoder 42, and the C of the decoder 42 is controlled to ON, and the gate 48i becomes ON and the gate 48h becomes OFF through the inverter 44. Further, the instruction word is read from the data bus 14 into the instruction first-reading buffer 46c. At the time t6, since both the reading-out and reading-in are not effected, the content "1" of the pointer 41 is not changed as it is. At the time t6, since the content of the pointer 41 is "3" and the instruction words are stored in all the instruction first-reading buffers 46a to 46c, the reading-in of the instruction word is not performed. As described above, in the microcomputer according to a second embodiment, since the bus interface means can be arranged to successively read in and read out the instruction words, it is possible to simplify the control of the buffer indicating means.

In a microcomputer according to a third embodiment of this invention, although not illustrated, the bus interface means is removed from the arrangements of the first and second embodiments of this invention. The operation thereof is similar to the operation described above except for the bus interface means, and therefore the description of the operation will be omitted.

Here, although in the description of the microcomputer according to the first embodiment the data buffer 34 for storing the data is arranged to have a 10-bit length and 30 bits in all, the bit length is not limited to 10 bits but can freely be set.

As described above, according to the first embodiment, all the instruction words to be used are unified with the first instruction words having the same word length and including the instruction for performing the calculation and others and the second instruction word similarly having the same word length and comprising the data such as the immediate data and offset data to be used for the calculation and others and the above-mentioned instruction words can be arranged to be treated, the effects can be obtained which simplifies the first-reading control of the above-mentioned instruction words.

According to the second embodiment, since the bus interface means is arranged to be capable of successively reading in and reading out the instruction words, in addition to the effect of the first embodiment, it is possible to provide an effect that the bus interface means has a simpler arrangement.

According to the third embodiment, since the bus interface means is not provided, it is possible to provide an effect that the microcomputer can cope with not only the immediate data (offset data) having a fixed length but also the variable length data which will be used for a future RISC processor.

What is claimed is:

1. A microcomputer equipped with a first instruction word including an instruction for performing a calculation and a second instruction word comprising data such as immediate data and offset data for a calculation, all the instruction words having word lengths uniform with each other, said microcomputer comprising:
   bus interface means including:
      a first buffer comprising a plurality of words;
      a first shifter for reading said first or second instruction word, stored in a memory area of a memory indicated by an address of an address register, from said memory through an address bus into a predetermined word position of said first buffer;

a second shifter for reading out said first or second instruction word from said word position; and first buffer indicating means for indicating said word position with respect to said first and second shifters;

a third shifter for performing a shifting operation by a predetermined number of bits so that data of said second instruction word read from said bus interface means are not overlapped with each other;

data combining means for combining the data of said second instruction word shifted by this predetermined number of bits by said third shifter;

data expansion means for adding a sign to a predetermined bit position of data combined by said data combining means so as to perform a sign-expansion to a predetermined word length;

instruction interpreting means for interpreting said first or second instruction word read from said bus interface means, and when the instruction word is said second instruction word, said instruction interpreting means shifting the data of said second instruction word by a predetermined number of bits through said third shifter and combining the data through said data combining means, and when the instruction is said first instruction of said first instruction word, expanding, through said expansion means, the data combined by said data combining means and performing, through an executing means, a calculation on the basis of the data expanded by said expansion means; and executing means for executing an instruction.

2. A microcomputer as claimed in claim 1, wherein said bus interface means comprises:

a second buffer different from said first buffer and coupled in series to said first buffer with the same number of words;

a fourth shifter for successively reading said first or second instruction word, stored in said memory area indicated by said address of said address register, from said memory through said address bus into said second buffer and reading out said first or second instruction word from said second buffer in order of the reading into said second buffer; and second buffer indicating means for, when the instruction words are read in said second buffer, increasing a numeric value by the number of the read instruction words and for, when said first or second instruction word is read out from said second buffer, decreasing said numeric value by the number of the read instruction words so as to control said fourth shifter in accordance with said numeric value.

3. A method for processing instructions in a microcomputer, said microcomputer equipped with a first instruction word including an instruction for performing a calculation and a second instruction word comprising data such as immediate data and offset data for a calculation, all the instruction words having word lengths uniform with each other, the method comprising:

providing a first buffer, in a bus interface device, for holding a plurality of words;

providing a first shifter;

reading said first or second instruction word, stored in a memory area of a memory indicated by an address of an address register, from said memory through an address bus and shifting said first or second instruction word, using said first shifter, to a predetermined word position of said first buffer;

providing a second shifter;

reading out said first or second instruction word from said word position, using said second shifter;

providing a first buffer indicating device;

indicating said word position with respect to said first and second shifters, using said buffer indicating device;

providing a third shifter;

performing a shifting operation by a predetermined number of bits, using said third shifter, so that data of said second instruction word read from said bus interface means are not overlapped with each other;

providing a data combining device;

combining, using said data combining device, the data of said second instruction word shifted by said predetermined number of bits by said third shifter;

providing a data expansion device;

adding a sign, using said data expansion device, to a predetermined bit position of data combined by said data combining device, so as to perform a sign-expansion to a predetermined word length;

providing an instruction interpreting device;

interpreting, in said instruction interpreting device, said first or second instruction word read from said bus interface device and, when the instruction word is said second instruction word, shifting the data, using said third shifter, a predetermined number of bits and combining the data, using said combining device, and, when the instruction is said first instruction word, interpreting an instruction of said first instruction word, using said instruction interpreting device, expanding, using said data expansion device, the data combined by said data combining device and performing a calculation on the basis of the data expanded by said data expansion device.

* * * * *